United States Patent

Narita et al.

[11] Patent Number: 5,267,315
[45] Date of Patent: Nov. 30, 1993

[54] SECRET IDENTIFICATION NUMBER CHECKING SYSTEM

[75] Inventors: Kiyokazu Narita; Toshio Takizawa, both of Tokyo, Japan

[73] Assignee: Oki Electric Industry Co., Ltd., Tokyo, Japan

[21] Appl. No.: 684,911

[22] PCT Filed: Oct. 16, 1989

[86] PCT No.: PCT/JP89/01062

§ 371 Date: Apr. 12, 1992

§ 102(e) Date: Apr. 12, 1992

[87] PCT Pub. No.: WO90/04832

PCT Pub. Date: May 3, 1990

[30] Foreign Application Priority Data

Oct. 18, 1988 [JP] Japan .................. 63-260384

[51] Int. Cl.⁵ ............................................. H04L 9/04
[52] U.S. Cl. ...................................... 380/24; 380/23; 380/25
[58] Field of Search ..................... 380/23-25

[56] References Cited

U.S. PATENT DOCUMENTS

| 4,612,413 | 9/1986 | Robert et al. ............... 380/23 |
| 4,802,218 | 1/1989 | Wright et al. ............... 380/23 |
| 4,910,773 | 3/1990 | Hazard et al. ............... 380/25 |
| 4,961,142 | 10/1990 | Elliot et al. ................. 380/24 |
| 5,036,461 | 6/1991 | Elliot et al. ................. 380/24 |
| 5,093,862 | 3/1992 | Scwartz ...................... 380/25 |

FOREIGN PATENT DOCUMENTS

| 60-49471 | 3/1985 | Japan . |
| 61-255491 | 11/1986 | Japan . |
| 62-128386 | 6/1987 | Japan . |
| 62-189593 | 8/1987 | Japan . |
| 62-221052 | 9/1987 | Japan . |
| 62-251946 | 11/1987 | Japan . |

Primary Examiner—Salvatore Cangialosi
Attorney, Agent, or Firm—Spencer, Frank & Schneider

[57] ABSTRACT

The present invention relates to a secret identification number checking system for comparing a secret identification number stored in a magnetic card (11) and a secret identification number entered by the bearer of the magnetic card. Data to enable the comparison is stored in a card medium (13), and the card medium (13) and a transaction machine (17) mutually authenticate each other. When if both the card medium (13) and the transaction machine (17) are legitimate, the card medium (13) sends the data to the transaction machine (17) to permit the secret identification number stored in the magnetic card (11) to be compared with the secret identification number entered by the bearer of the magnetic card. The secret identification number checking system thus improves the security of transactions.

11 Claims, 4 Drawing Sheets

FIG. 1
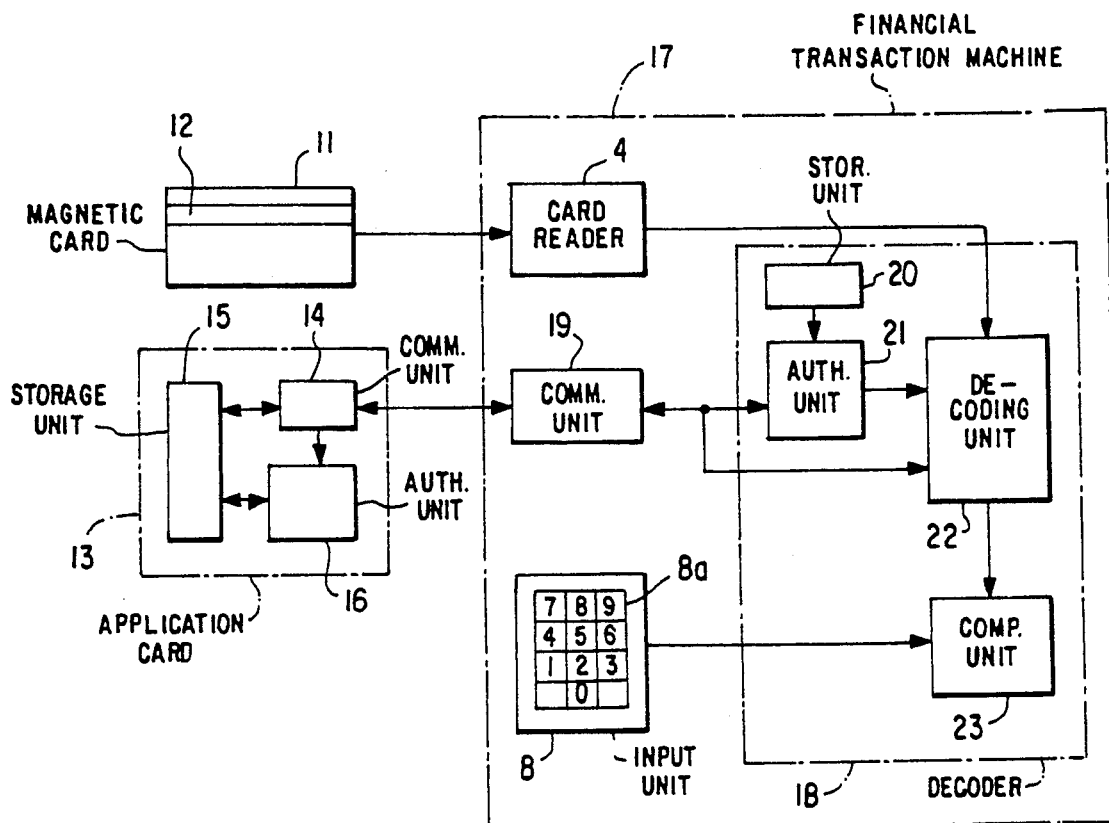
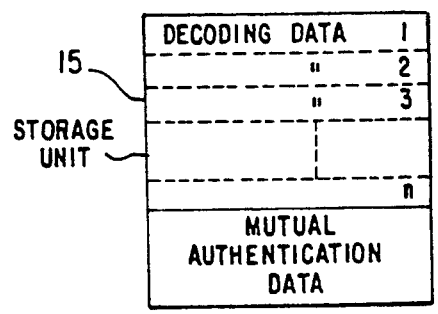
FIG. 2

SECRET IDENTIFICATION NUMBER CHECKING SYSTEM

BACKGROUND OF THE INVENTION

The present invention relates to a secret identification number checking system of the type in which a secret identification number is entered by the bearer of a magnetic card before a financial transaction is allowed to proceed.

A conventional magnetic card for financial transactions stores a secret identification number. During a financial transaction the magnetic card reader of a transaction machine reads the secret identification number from the magnetic card so that it can be compared with a secret identification number that is entered by the bearer of the magnetic card. The legitimacy or rightfulness of the bearer of the magnetic card is verified if the two numbers match. However, such a secret identification number checking system has the disadvantage that the secret identification number can be obtained by an unserupulous third person because it can readily be read out of the magnetic card.

A previously proposed secret identification number checking system stores the code representing a secret identification number in the magnetic card. The magnetic card reader carries out a decoding program to decode the stored code into the corresponding secret identification number during verification of the secret identification number that is entered by the bearer of the card. However, since a storage means (read-only memory) which stores the decoding program can readily be taken out of the magnetic card reader, and read means for reading the contents of the storage means are readily available, a person having expert knowledge in the relevant field could easily analyze the coding algorithm and detect the secret identification number.

Another previously proposed secret identification number checking method uses a magnetic card which does not store any secret identification number, and a host computer installed in a control center is employed to verify the legitimacy or rightfulness of the bearer of the magnetic card. FIG. 5 shows a transaction machine for carrying out such a secret identification number checking method. Referring to FIG. 5, a bank code number, a branch office code number, and an account number that is assigned to the bearer are recorded in the magnetic stripe 2 of a magnetic card 1. A financial transaction machine 3 comprises a card reader 4 for reading data recorded in the magnetic stripe 2 of the magnetic card 1, a card data processor 5 for processing the data read by the card reader 4, a communication controller 6 for sending data obtained by processing the data read by the card reader 4 through a communication line 7 to a host computer 9 installed in a control center, and a secret identification input device 8 by which the bearer of the magnetic card enters his secret identification number. The secret identification number of the bearer is stored in a file of the host computer 9.

When the magnetic card 1 is inserted in the transaction machine 3 by the bearer, the card reader 4 reads the data recorded on the magnetic stripe 2 and sends it to the card data processor 5. The card data processor selects data necessary for checking the secret identification number, such as the bank code number, the branch office code number and the account number, of the bearer, and sends these data to the communication controller 6. The communication controller sends 6 the data for checking the secret identification number through the communication line 7 to the host computer 9 at the control center. The host computer retrieves the secret identification number of the bearer from the file by using the branch office code number and the account number as retrieval keys.

Additionally the bearer operates the secret identification number input device 8 to enter the secret identification number. Then, the secret identification number is sent through the card data processor 5, the communication controller 6 and the communication line 7 to the host computer 9. The host computer 9 then compares the secret identification number entered by the bearer with the secret identification number retrieved from the file. If these secret identification numbers coincide with each other, the host computer 9 sends a transaction start signal to the transaction machine 3.

However, the secret identification number can easily be eavesdropped by tapping the communication line because this method transmits the secret identification number through the communication line. The use of the communication line also increases communication costs and the time needed to check the secret identification number. Furthermore, checking the secret identification number places an additional burden on the host computer.

SUMMARY OF THE INVENTION

Accordingly, it is an object of the present invention to provide a secret identification number checking system which is capable of enhancing the security of transactions and which avoids burdening a host computer, by using an external storage means that is separate from a transaction machine to store information for use in comparing a secret identification number that entered by the bearer of a magnetic card with a secret identification number that is stored as a code in the magnetic card, and by using the transaction machine to check the secret identification number after mutual authentication by the transaction machine and a device which includes the external storage means.

This object can be attained by providing a secret identification number checking system which includes: an IC card medium storing decoding information for use in comparing a secret identification number entered by the bearer of a magnetic card with an encrypted secret identification number written in the magnetic card, and storing mutual authentication data for use in a mutual authentication procedure and means, in a financial transaction machine, for storing further mutual authentication data and for enabling the comparison of the secret identification number entered by the bearer with the secret identification number written in the magnetic card on the basis of the decoding information. The card medium and the financial transaction machine mutually authenticate each other, and the card medium sends the decoding information to the financial transaction machine if when both the card medium and the encrypting and decoding means are rightful. This since this procedure can be achieved without using the host computer at the control center, the secret identification number cannot be discovered improperly by tapping the communication line and the burben on the host computer is reduced.

Since the card medium and the financial transaction machine authenticate each other mutually, and a check of the secret identification number is forbidden if the card medium and the financial transaction machine are not both legitimate the security of transactions is enhanced.

BRIEF DESCRIPTION OF THE DRAWINGS

FIG. 1 is a block diagram of a secret identification number checking system in a preferred embodiment according to the present invention;

FIG. 2 is a view of assistance in explaining an AP card employed in the embodiment of the present invention;

DESCRIPTION OF THE PREFERRED EMBODIMENT

Figure 3:
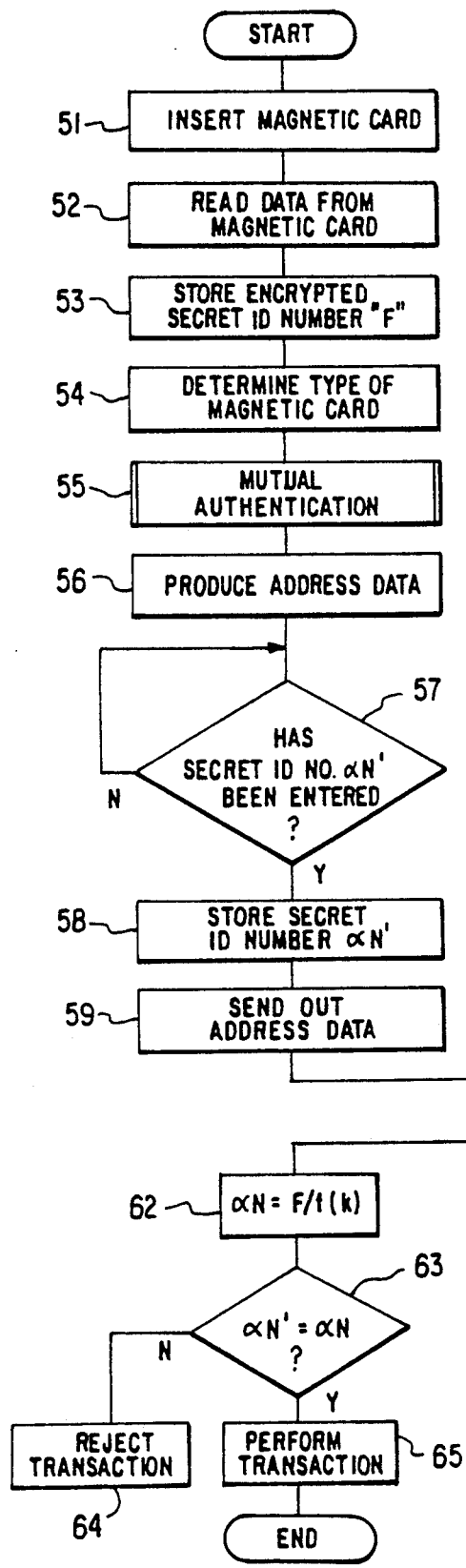
FIG. 3 is a flow chart of a procedure that is executed by the embodiment of the present invention.
Figure 3:
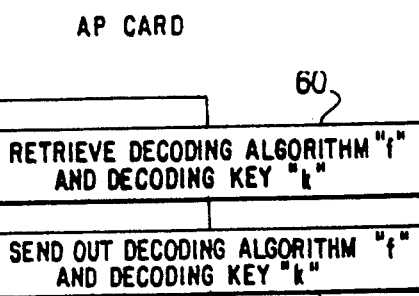

A secret identification number checking system in a preferred embodiment according to the present invention will be described hereinafter with reference to the accompanying drawings, in which like parts are denoted by the same reference characters throughout the drawings.

The construction of the secret identification number checking system embodying the present invention will be described with reference to FIG. 1.

A magnetic card 11 is used for financial transactions and can be a credit card or a cash card. The magnetic card 11 has a magnetic stripe 12 for storing data. The data stored in the magnetic stripe 12 include cryptographic data F representing a secret identification number $\alpha N$ specifying the bearer of the magnetic card 11. The data stored in the magnetic stripe 12 also includes discriminating information, which identifies the type of magnetic card 11, for example, a credit card or a cash card. A bank number, a branch office number, and an account number of the bearer are also stored in the magnetic stripe 12. The secret identification number $\alpha N$ specifying the bearer is encrypted by known means to provide the cryptographic data F, which is written in the magnetic stripe 12 when the magnetic card 11 is issued.

The secret identification number checking system in this embodiment uses an application card (hereinafter referred to as "AP card") 13 as a card medium. The AP card 13 is an IC card in common parlance and has an IC chip comprising a microcomputer, memories, and peripheral circuits embedded therein, so that the AP card 13 is capable of data storage and data processing functions. The IC chip provides AP card 13 with a communication unit 14, a storage unit 15 and an authentication unit 16. Data are transmitted between the AP card 13 and a financial transaction machine 17, which will be described afterward, through the communication unit 14. As shown in FIG. 2, which illustrates the contents of the memory unit 15 of AP card 13, the storage unit 15 stores a plurality of decoding datasets. These datasets are provided for decoding different cryptographic data F stored in the magnetic stripes 12 of magnetic cards 11 of different types, respectively. Each decoding dataset comprises a decoding algorithm f and a decoding key k. The decoding algorithm f and the decoding key k are information to enable the cryptographic code of the secret identification number to be decrypted or decoded into the secret identification number s. That the a secret identification number entered by the bearer can be compared with the decoded secret identification number. As shown in FIG. 2, mutual authentication data is also stored in storage unit 15 for use during mutual authentication between a decoder, which is part of the financial transaction machine 17 and which will be described afterward, and the AP card 13. The mutual authentication data comprises key information $KID_2$, random numbers $\alpha N_2$ and an algorithm $f_2$. The authentication unit 16 determines if the financial transaction machine 17 is a rightful or legitimate one on the basis of the mutual authentication data stored in the storage unit 15 and mutual authentication data stored in the financial transaction machine 17.

The financial transaction machine 17 comprises a card reader 4 for reading the information written in the magnetic stripe 12 of the magnetic card 11, a decoder 18 for decoding the cryptographic data and checking the secret identification number by comparison, a communication unit 19 through which data are transmitted between the AP card 13 and the decoder 18, and a secret identification number input unit 8 which is operated by the bearer to enter his or her secret identification number.

The card reader 4 reads the magnetic data written in the magnetic stripe 12 of the magnetic card 11, including the cryptographic data F representing the bearer's secret identification number, the card identifying number discriminating the type of magnetic card 11, and the account number, the card reader 4 converts the magnetic data into corresponding electric signals, and sends the electric signals to the decoder 18.

The decoder 18 comprises a storage unit 20, an authentication unit 21, a decoding unit 22 and a comparing unit 23. The storage unit 20 stores mutual authentication data for the mutual authentication between the AP card and the decoder 18, including key data $KID_1$, random numbers $\alpha N_1$ and an algorithm $f_1$. The authentication unit 21 executes mutual authentication on the basis of the mutual authentication data stored in the storage unit 20 and the mutual authentication data stored in the storage unit 15 of the AP card 13 to check the rightfulness or legitimacy of the AP card 13. The decoding unit 22 receives the cryptographic secret identification number read by the card reader 4, along with decoding information from the AP card 13 of the authentication unit determines that the AP card is a legitimate one. The decoding unit then decodes the cryptographic secret identification number by using the decoding data. The comparing unit 23 compares the decoded secret identification number decoded by the decoding unit 22 to the secret identification number entered by the bearer via the secret identification number input unit 8.

The communication unit 19 reads the data stored in the storage unit 15 of the AP card 13, sends the same to the decoder 18, and sends data provided by the decoder 18 to the AP card 13.

The secret identification number input unit 8 has a keyboard 8a. The bearer operates the keyboard 8a to enter his or her secret identification number. The secret identification number entered by operating the keyboard 8a is converted into a corresponding electric signal, which is sent to the comparing unit 23 of the decoder 18. The secret identification number input unit 8 is disposed outside the financial transaction machine 17 for operation by the bearer of the magnetic card 12.

The operation of the secret identification number checking system will be described hereinafter with reference to FIG. 3, which shows the overall procedure executed by the secret identification number checking system, and FIG. 4, which shows the mutual authentication procedure.

Figure 4:
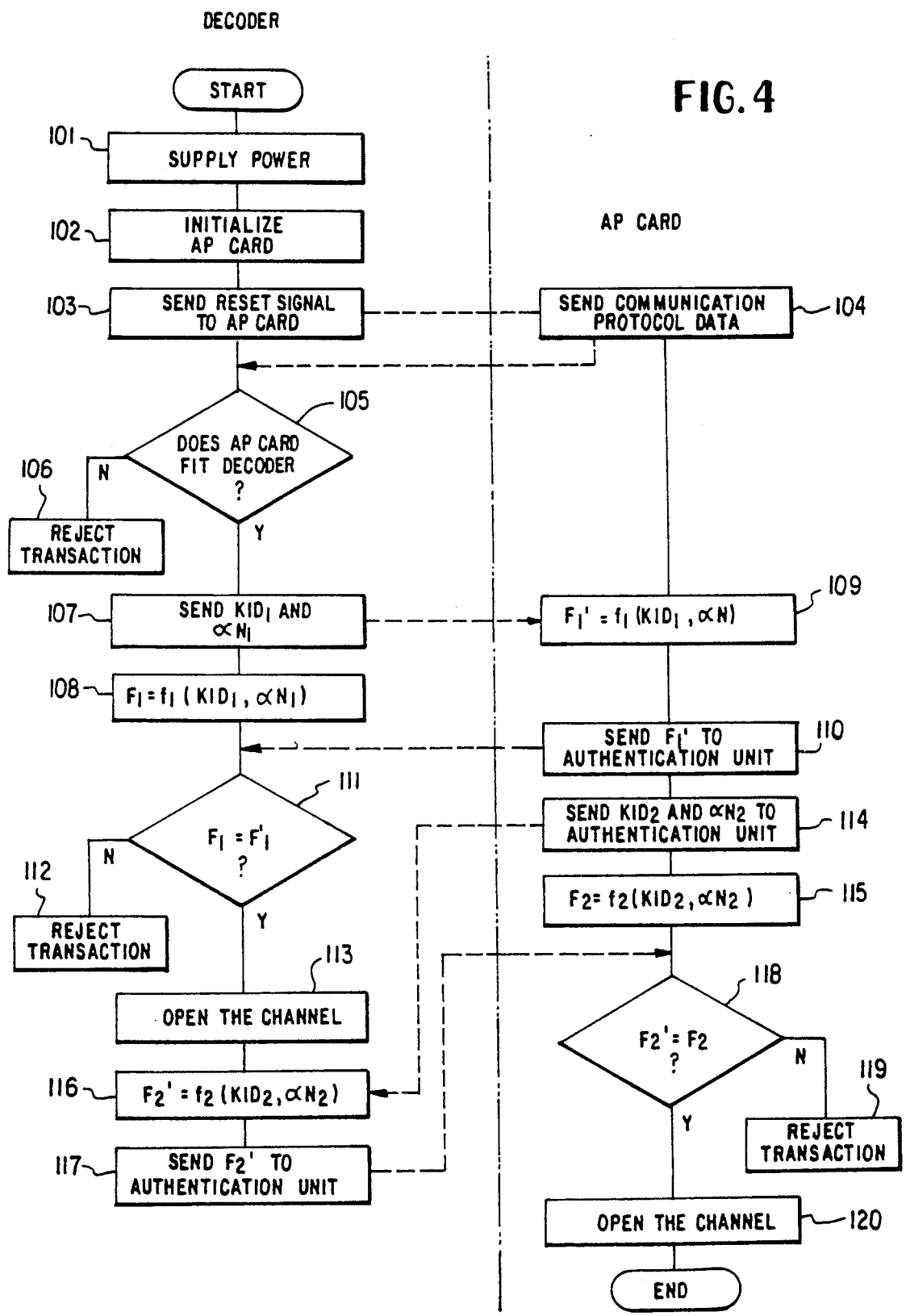
FIG. 4 is a flow chart of a mutual authentication procedure that is depicted in the flow chart of FIG. 3.
Figure 5:
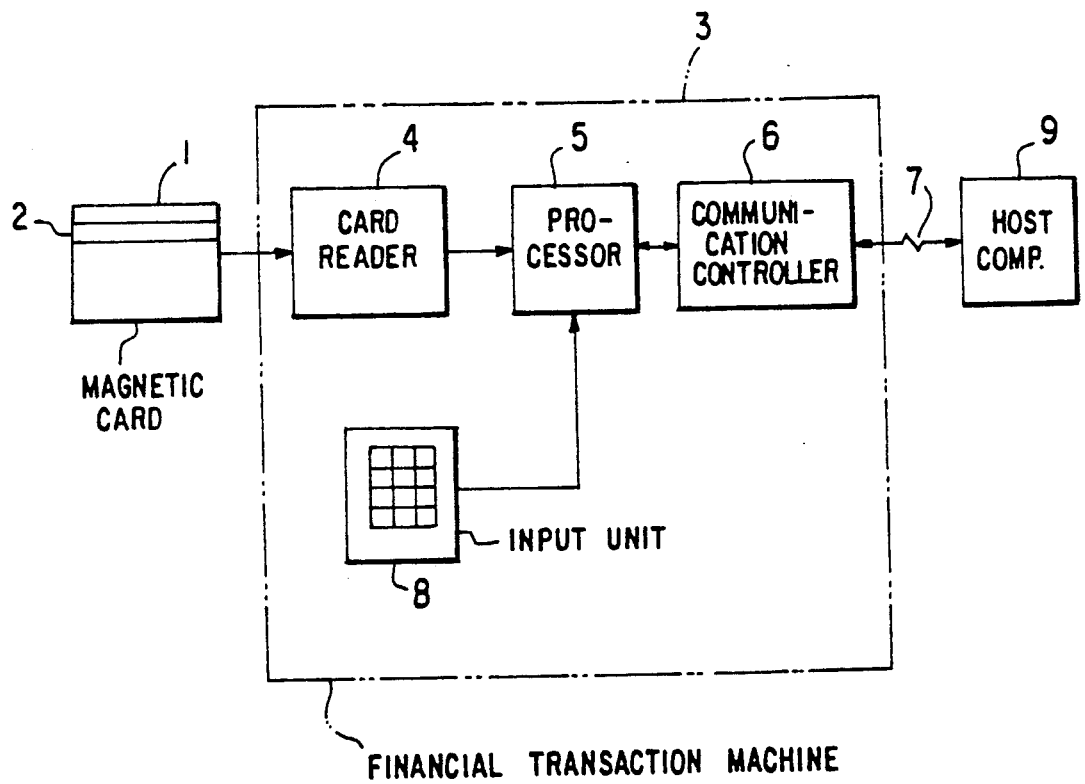
FIG. 5 is a block diagram of a conventional secret identification number checking system.

Referring to FIGS. 1 and 3, in an initial step (Step 51) the bearer of the magnetic card 11 inserts it into a slot, not shown, in the transaction machine 17. Then, in Step 52, the card reader 4 reads the data written in the magnetic stripe 12 of the magnetic card 11. This data includes the cryptographic secret identification number F and the card for identifying data discriminating the type of magnetic card 11. The card reader 4 converts the data it reads into corresponding electric signals and sends the electric signals to the decoding unit 22 of the decoder 18. The decoding unit 22 stores the cryptographic secret identification number F included in the received data in Step 53, and determines the type of the magnetic card 11 on the basis of the card discriminating data in Step 54. Other data are stored in the decoding unit 22. In Step 55, a mutual authentication procedure is executed. The mutual authentication procedure will be described below with reference to FIGS. 1 and 4.

The mutual authentication procedure is executed for so that the AP card 13 and the decoder 18 can mutually authenticate each other; the AP card 13 confirms the legitimacy of the decoder 18 in order to avoid sending data to decoders other than a legitimate decoder 18, and the decoder 18 examines if the AP card 13 is legitimate.

When it is inserted in the transaction machine 17, the AP card 13 is connected electrically to the communication unit 19 and, in Step 101, receives power from a power supply, not shown, provided in the transaction machine 17. The AP card 13 is initialized in Step 102. Then, the decoding unit 22 sends a reset signal through the communication unit 19 to the AP card 13 in Step 103. In response to the reset signal, the authentication unit 16 of the AP card 13 sends out communication protocol data including attributes associated therewith in Step 104. Then, in Step 105, the authentication unit 21 of the decoder 18 makes a query to see if the AP card 13 fits the decoder 18. If the response in Step 105 is negative, the authentication unit 21 of the decoder sends a transaction rejection signal to the control unit, not shown, of the transaction machine 17 in Step 106. If the response in Step 105 is affirmative, in Step 107 the authentication unit 21 sends the key data $KID_1$ and random numbers $\alpha N_1$ read from the storage unit 20 through the communication units 19 and 14 to authentication unit 16 of the AP card 13. In Step 108, the authentication unit 21 manipulates the key data $KID_1$ and the random numbers $\alpha N_1$ according to the algorithm $f_1$ read from the storage unit 20 to obtain the key data $F_1$. Meantime, the authentication unit 16 of the AP card 13 obtains key data $F_1'$ in Step 109 by manipulating the mutual authentication data including the key data $KID_1$ and the random numbers $\alpha N_1$ according to the an algorithm that is stored in the storage unit 15 and that is the same as the algorithm $f_1$ stored in the decoder 18. In Step 110 the key data $F_1'$ is sent through the communication units 14 and 19 to the authentication unit 21 of the decoder 18. Then, in Step 111, the authentication unit 21 decides if the two sets of key data $F_1$ and $F_1'$ coincide with each other. If the AP card 13 is not legitimate, algorithm that is stored in the storage unit 15 of the AP card 13 is not the same as the algorithm $f_1$ that is stored in the decoder 18, so that the key data $F_1$ cannot be obtained and hence the decision in Step 111 is negative. In the event that the two sets of key data do not coincide with each other, the transaction is rejected in Step 112. If the two sets of key data coincide with each other, the decoder 18 decides that the AP card 13 is legitimate and opens its channel to the AP card 13 in Step 113.

Then, in Step 114 the authentication unit 16 of the AP card 13 sends the card's mutual authentication data, including the key data $KID_2$ and the random numbers $\alpha N_2$ stored in the storage unit 15, to the authentication unit 21 of the decoder 18. Furthermore, in Step 115 the AP card 13 calculates a key data $F_2$ by manipulating the key data $KID_2$ and the random numbers $\alpha N_2$ according to the algorithm $f_2$ stored in the storage unit 15. In the meantime, the authentication unit 21 of the decoder calculates a key data $F_2'$ in Step 116. The key data $F_2$ is calculated by manipulating the mutual authentication data supplied by AP card 113, including the key data $KID_2$ and the random numbers $\alpha N_2$, according to an algorithm that is stored in the storage unit 20 of the decoder 18 and that is the same as the algorithm $f_2$ stored in the storage unit 15 of the AP card 13. In Step 117 the key data $F_2'$ is sent through the communication units 19 and 14 to the authentication unit 16 of the AP card 13. In Step 118, the authentication unit 16 of the AP card 13 decides if the two sets of key data $F_2$ and $F_2'$ coincide with each other. If the decoder 18 is not legitimate, the algorithm stored in the decoder 18 is not the same as the algorithm $f_2$ stored in the storage unit 15 of the AP card 13. Therefore no key data is obtained or a different key data is obtained and, consequently, the decision in Step 118 is negative. If the two sets of key data do not coincide with each other, the transaction is rejected in Step 119. If the two sets of key data coincide with each other, the AP card 13 decides that the decoder 18 is legitimate and opens its channel to the decoder 18 in Step 120.

Thus, the mutual authentication is completed. The operation of the embodiment will be further described with reference to FIGS. 1 and 3 again.

Referring to FIG. 3, in Step 56, the decoding unit 22 of the decoder 18 produces information specifying addresses in the storage unit 15 of the decoding data that are relevant to the type of the magnetic card 11 identified in Step 54 (i.e., the addresses of the decoding algorithm f and the decoding key k). In Step 57, the controller, not shown, of the transaction machine 17 makes a query to see if a secret identification number $\alpha N'$ has been entered by operation of the keyboard 8a of the secret identification number input unit. If the response in Step 57 is affirmative, the secret identification number $\alpha N'$ is stored in the comparing unit 23 in Step 58. Then, in Step 59, the decoding unit 22 sends the address data produced in Step 56 through the communication units 19 and 14 to the authentication unit 16 of the AP card 13. In Step 60, the authentication unit 16 of the AP card 13 retrieves the decoding algorithm f and the decoding key k from the storage unit 15 according to the address data, and then, in Step 61, the authentication unit 16 sends the decoding algorithm f and the decoding key k through the communication units 14 and 19 to the decoding unit 22 of the decoder 18. The decoding unit 22 decodes the cryptographic secret identification number F stored in Step 53 on the basis of the decoding algorithm f and the decoding key k to obtain a corresponding secret identification number $\alpha N$ in Step 62. In Step 63 the comparing unit 23 compares the secret identification number aN' entered by the bearer and stored in Step 58 with and the decoded secret identification number aN, and decides if the secret identification numbers aN and aN' coincide with each other. If the decision in Step 13 is negative, the transaction is rejected in Step 64, and if affirmative, the comparing unit 23 sends a signal to carry out the transaction to the control unit, not shown, of the transaction machine 18 in Step 65.

The object of the present invention can be achieved by using an encrypting device instead of the decoder 18. If an encrypting device is employed instead of the decoder, the secret identification number aN' entered by the bearer of the magnetic card would be encrypted, and the encrypted secret identification number would be compared with an encrypted secret identification number F that is stored in the magnetic card. The encryption data that is stored in the AP card would consist of an encryption algorithm and an encryption key. The secret identification number aN' entered by the bearer of the magnetic card would be encrypted on the basis of the encryption data by the encrypting device into an encrypted secret identification number F'. The encrypted secret identification number F' and the encryptographic secret identification number F read by the card reader would then be compared. Naturally, the mutual authentication procedure between the AP card and the encrypting device would be executed also in this case.

It is also possible to store sets of decoding data respectively relating to magnetic cards of different types in AP cards, and to use a magnetic card in combination with an AP card storing a set of decoding data relevant to the same magnetic card. This combined use of a magnetic card and an AP card storing a set of decoding data relevant to the same magnetic card is effective to keep the decoding data secret from third persons, including the operator of a magnetic card processing apparatus, when the AP card and the magnetic card are issued by the same issuing agent.

As is apparent from the foregoing description, a secret identification number checking system in accordance with the present invention is effectively applicable to banking transactions using a cash dispenser and to transactions using an apparatus for dealing with credit cards. The secret identification number checking system is particularly suitable for transaction systems in which security is important.

We claim:

1. An improved secret identification number checking system for a transaction machine which reads a first secret identification number stored in a magnetic card and which receives a second secret identification number that is manually entered on a secret identification number input means, wherein the improvement comprises:

an IC card medium, the IC card medium being separate from the magnetic card and being removably connected to the transaction machine, the IC card medium including storage means for storing first mutual authentication data and for storing decoding data to enable the first and second secret identification numbers to be compared, and communication means for communicating with the transaction machine;

further storage means, included in the transaction machine, for storing second mutual authentication data;

further communication means, included in the transaction machine, for communicating with the IC card medium;

authentication means, included in the IC card medium and the transaction machine, for permitting the IC card medium and the transaction machine to mutually authenticate each other on the basis of the first and second mutual authentication data, the IC card medium sending the decoding data to the transaction machine if both the IC card medium and the transaction machine are authenticated;

means, included in the transaction machine, for transforming one of the first and second secret identification numbers into a transformed secret identification number on the basis of the decoding data; and comparing means, provided in the transaction machine, for comparing the transformed secret identification number to the other of the first and second secret identification numbers.

2. The secret identification number checking system of claim 1, wherein the magnetic card is of a first type, wherein the decoding data corresponds to the first type of magnetic card, and wherein the storage means included in the IC card medium additionally comprises means for storing further decoding data corresponding to a second type of magnetic card.

3. The secret identification number checking system of claim 2, wherein one type of magnetic card is a credit card and the other type of magnetic card is a cash card.

4. The secret identification number checking system of claim 1, wherein the means for transforming comprises means for decoding the first secret identification number, and wherein the comparing means comprises means for comparing the decoded first secret identification number with the second secret identification number.

5. An improved secret identification number checking system for a transaction machine which reads a first secret identification number stored in a magnetic card and which receives a second secret identification number that is manually entered on a secret identification number input means, wherein the improvement comprises;

a unit having an IC which includes means for storing decoding data, the unit being separate from the magnetic card and being removably connected to the transaction machine;

means for executing an authentication procedure in which the transaction machine determines whether the unit is authentic;

means for transferring the decoding data from the unit to the transaction machine if the means for executing an authentication procedure determines that the unit is authentic;

means for utilizing the decoding data to transform one of the first and second secret identification numbers into a transformed secret identification number if the decoding data is transferred to the transaction machine; and means for comparing the transformed secret identification number to the other of the first and second secret identification numbers.

6. The secret identification number checking system of claim 5, wherein the unit comprises an IC card.

7. The secret identification number checking system of claim 5, wherein the means for executing an authentication procedure comprises means for storing authentication data in the transaction machine, means in the transaction machine for utilizing the authentication data to calculate a first key data, means for transferring the authentication data to the unit, means in the unit for utilizing the authentication data to calculate a second key data, means for transferring the second key data to the transaction machine, and means in the transaction machine for comparing the first and second key data.

8. The secret identification number checking system of claim 5, wherein the authentication procedure is a mutual authentication procedure which additionally permits the unit to determine whether the transaction machine is authentic, and wherein the means for transferring comprises means for transferring the predetermined data if the means for executing an authentication procedure determines that both the unit and the transaction machine are authentic.

9. An improved secret identification number checking system for a transaction machine which reads a first secret identification number stored in a magnetic card and which receives a second secret identification number that is manually entered on a secret identification number input means, wherein the improvement comprises:
   a unit having an IC which includes means for storing decoding data, the unit being separate from the magnetic card and being removably connected to the transaction machine;
   means for executing an authentication procedure in which the unit determines whether the transaction machine is authentic;
   means for transferring the decoding data from the unit to the transaction machine if the means for executing an authentication procedure determines that the transaction machine is authentic;
   means for utilizing the decoding data to transform one of the first and second secret identification numbers into a transformed secret identification number if the decoding data is transferred to the transaction machine; and
   means for comparing the transformed secret identification number to the other of the first and second secret identification numbers.

10. The secret identification number checking system of claim 9, wherein the unit comprises an IC card.

11. The secret identification number checking system of claim 5, wherein the means for executing an authenticating procedure comprises means for storing authentication data in the unit, means in the unit for utilizing the authentication data to calculate a first key data, means for transferring the authentication data to the transaction machine, means in the transaction machine for utilizing the authentication data to calculate a second key data, means for transferring the second key data to the unit, and means in the unit for comparing the first and second key data.

* * * * *